(12) United States Patent
Khartabil et al.

(10) Patent No.: US 7,280,533 B2
(45) Date of Patent: Oct. 9, 2007

(54) SYSTEM AND METHOD FOR PRESENCE-BASED ROUTING OF COMMUNICATION REQUESTS OVER A NETWORK

(75) Inventors: Hisham Khartabil, Helsinki (FI); Georg Mayer, Espoo (FI)

(73) Assignee: Nokia Corporation, Espoo (FI)

( * ) Notice: Subject to any disclaimer, the term of this patent is extended or adjusted under 35 U.S.C. 154(b) by 59 days.

(21) Appl. No.: 10/686,000

(22) Filed: Oct. 15, 2003

(65) Prior Publication Data

US 2005/0083904 A1    Apr. 21, 2005

(51) Int. Cl.
*H04L 12/66*    (2006.01)
(52) U.S. Cl. .................... 370/352; 370/338; 455/435.1
(58) Field of Classification Search .............. 370/351, 370/352, 389, 392, 395.2, 395.3, 395.31, 370/229, 231, 235, 236, 328, 329, 331, 401; 709/227, 228; 455/432.1, 432.3, 433, 435.1, 455/404.2
See application file for complete search history.

(56) References Cited

U.S. PATENT DOCUMENTS

| 2002/0037723 | A1* | 3/2002 | Roach ........................ 455/435 |
| 2002/0136206 | A1* | 9/2002 | Gallant et al. .............. 370/352 |
| 2003/0233457 | A1* | 12/2003 | Basilier et al. ............. 709/227 |
| 2004/0006623 | A1* | 1/2004 | Gourraud et al. .......... 709/227 |
| 2004/0037406 | A1* | 2/2004 | Gourraud ............... 379/202.01 |
| 2004/0109459 | A1* | 6/2004 | Madour et al. ............. 370/401 |
| 2004/0156490 | A1* | 8/2004 | Adams et al. .............. 379/126 |
| 2004/0180646 | A1* | 9/2004 | Donley et al. ............. 455/411 |
| 2005/0083941 | A1* | 4/2005 | Florkey et al. .......... 370/395.2 |
| 2005/0170861 | A1* | 8/2005 | Niemi et al. ............. 455/552.1 |

OTHER PUBLICATIONS

J. Rosenberg et al., SIP: Session Initiation Protocol. pp. 1-269.
3GPP TS 23.228 V6.2.0 (Jun. 2003). 3rd Generation Partnership Project; Technical Specification Group Services and System Aspects; IP Multimedia Subsystem (IMS); Stage 2 (Release 6). pp. 1-143.
3GPP TS 24.228 V5.5.0 (Jun. 2003). 3rd Generation Partnership Project; Technical Specification Group Core Network; Signaling flows for the IP multimedia call control based on SIP and SDP; Stage 3 (Release 5). pp. 1-825.
3GPP TS 24.229 V5.5.0 (Jun. 2003). 3rd Generation Partnership Project; Technical Specification Group Core Network; IP Multimedia Call Control Protocol (SIP) and Session Description Protocol (SDP); Stage 3 (Release 5). pp. 1-253.

* cited by examiner

*Primary Examiner*—Brian Nguyen
(74) *Attorney, Agent, or Firm*—Hollingsworth & Funk, LLC

(57) ABSTRACT

A system, apparatus, and method for routing communication requests based on user presence information. A network entity subscribes to the presence information of a user, and receives notifications of the users' presence information when the user has registered with the network or the presence information has changed. In response, the network entity creates routing instructions based on the presence information. In this manner, incoming communication requests can be appropriately routed according to the routing instructions.

33 Claims, 7 Drawing Sheets

```
       ┌ If (caller-domain == "ExampleDomain.com" && call-type == "voice") {
   702 ┤
       └     RouteCallTo(sip:user@mobilephone.operator.com);

┌ } else if (caller-domain == "ExampleDomain.com" && call-type != "voice") {
   704 ┤
700 ┤  └     RouteCallTo(sip:user@PDA.operator.com);

┌ } else if (caller-domain != "ExampleDomain.com" {
   706 ┤
       └     RouteCallTo(sip:user@voicemail.operator.com);

```
       ┌ If (call-type="video") {
   712 ┤     RouteCallTo(sip:user@PDA.operator.com);
       └ }
710 ┤
       ┌ If (call-type="voice") {
   714 ┤     RouteCallTo(sip:user@voicemail.operator.com);
       └ }
```

*FIG. 7B*

SYSTEM AND METHOD FOR PRESENCE-BASED ROUTING OF COMMUNICATION REQUESTS OVER A NETWORK

FIELD OF THE INVENTION

This invention relates in general to network communications, and more particularly to a system, apparatus and method for routing communication requests based on user presence information.

BACKGROUND OF THE INVENTION

Communications between networked devices can be accomplished in a variety of ways. Users can communicate with one another via voice connections; users can browse content on other systems or devices; messages can be sent using services such as Short Messaging Service (SMS) or Multimedia Messaging Service (MMS); messages may be e-mailed; and so forth. Some communications, such as SMS/MMS messaging and e-mail, may not involve real-time communication between the end users. Other communications involve an actual or logical connection between the communicating parties. A "session" generally refers to a logical connection between computers or other devices and the communications exchanged between those devices while they are connected. A multimedia session involves a set of multimedia senders and receivers and the data streams flowing therebetween.

Users who may be involved in such network sessions may be in situations where they are willing to accept incoming calls, messages, or other multimedia communications. At other times, the users may not want to be disturbed. Today's communications technologies provide communication initiators with ample abilities to contact their targeted communication recipients, particularly with the prolific use of mobile devices. Mobile device users tend to keep their mobile devices with them most or all of the time, which provides great convenience to the users, but may also cause interruptions when incoming communications are unwanted or otherwise inconvenient. For example, a user may enter a business meeting, and may not want to be disturbed by incoming voice or media calls. The users therefore have times, locations, and/or situations where they are, or are not, willing or able to accept incoming communications. This concept is generally referred to as the user's "presence."

Generally, presence refers to the willingness and/or ability of a user to communicate with other users over a network. A variety of different preference indicators may be associated with a user's preference, such as user availability, connection status, various user identities, device capabilities, and the like. Users can set and modify their presence state at their respective terminals, and this presence information can be used to manage incoming communication requests.

However, some networks do not take the users' presence status into account. For example, the 3rd Generation Partnership Project (3GPP) IP Multimedia core network Subsystem (IMS) is an architecture for supporting multimedia services via a Session Initiation Protocol (SIP) infrastructure. In an IMS network, after a user has set his/her presence information, he/she will still receive incoming media calls or other session initiation requests even though undesired, where the network does not consider the presence status of the user.

Accordingly, there is a need for a manner of ensuring that users' presence information is considered for communications over networks such as IMS networks. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus and method for routing communication requests based on user presence information. A network entity can subscribe to the presence information of a user(s), and receive notifications of the users' presence information when the user has registered with the network or the presence information has changed. In response, the network entity creates routing instructions based on the presence information. In this manner, incoming communication requests can be appropriately routed according to the routing instructions.

In accordance with one embodiment of the invention, a method is provided for routing communication requests targeted for a user over a network. The method includes subscribing a network entity to presence information of the user, and receiving notifications at the subscribing network entity indicating a state of the user presence information. Routing instructions are created for routing incoming communication requests targeted for the user, based on the state of the presence information.

According to more particular embodiments of such a method, the incoming communication requests are routed according to the routing instructions. The routing instructions may be stored for reference by the network entity upon receipt of the incoming communication requests. The routing instructions may be realized, for example, by creating a routing script. In another embodiment, the routing instructions may be realized by dynamically modifying filter criteria received from a database entity based on the presence information of the user. In other embodiments, receiving the notification of the presence state involves receiving notifications at the subscribing network entity indicating a change of state of the presence information, where in other embodiments receiving the notification involves receiving a notification indicating a state of the presence information at the time of the subscription of the network entity to the presence information. In one embodiment, the user equipment is registered with the network entity, and subscribing the network entity to the user presence information involves subscribing the network entity to the user presence information in response to the registration of the user equipment. In still other embodiments, the user presence information is published, such as published via a presence application server.

In accordance with another embodiment of the invention, a method is provided for routing communication requests targeted for a user over a network including an IP Multimedia core network Subsystem (IMS) network. The method includes subscribing a Serving Call Session Control Function (S-CSCF) to user presence information published on the network. A notification(s) is received at the S-CSCF indicating a state of the user presence information. The S-CSCF creates a routing script based on the state of the presence information. Communication requests targeted for the user and received at the S-CSCF are routed to one or more destinations as dictated by the routing script.

In more particular embodiments of such a method, attributes of the communication requests received at the S-CSCF are identified, and routing of such communication requests to a destination(s) involves routing the communication requests as dictated by the routing script and depending on the attributes of the communication requests. Such attributes may include, for example, a caller identity, a caller domain, a caller equipment type, a communication request priority, a communication request type, etc. In other embodiments of the invention, subscribing and notifying are accomplished using SIP, such as through the use of SIP SUBSCRIBE and NOTIFY methods. The routing script in one embodiment is created via a scripting language, i.e., where a program is created to cause the incoming communication requests to be routed according to the user presence information upon execution of the program. In another embodiment, the routing script is created as a data structure that provides routing actions for each association of user presence information and communication request attributes.

In accordance with another embodiment of the invention, a network entity is provided for routing communication requests targeted for a user over a network. The network entity includes a processor, which may include one or more processing devices/components. A subscription module operable with the processor is configured to subscribe to user presence information published on the network. A notification management module operable with the processor is configured to receive notifications of a state of the user presence information. A routing instruction generation module operable with the processor is configured to convert the state of the user presence information to routing instructions. A routing module operable with the processor is configured to identify one or more routing destinations for incoming communication requests targeted for the user based on the routing instructions. In more particular embodiments, the network includes an IP Multimedia core network Subsystem (IMS) network, and the network entity is a Serving Call Session Control Function (S-CSCF).

According to another embodiment of the invention, a system is provided for routing communication requests via an IP Multimedia core network Subsystem (IMS) network. The system includes at least one User Equipment (UE), and a presence server coupled to receive and publish presence information associated with the UE. A Serving Call Session Control Function (S-CSCF) is provided that includes a processor configured to subscribe to the published presence information associated with the UE and to receive notifications of a state of the published presence information. The processor is further configured to generate routing instructions for incoming communication requests targeted for the UE based on the state of the published presence information.

According to another embodiment of the invention, a computer-readable medium is provided that includes instructions that are executable by a computer system for routing communication requests targeted for a user over a network. The instructions executable by the computer system perform steps including subscribing a network entity to presence information of the user, receiving at least one notification at the subscribing network entity indicating a state of the presence information of the user, and creating routing instructions for routing incoming communication requests targeted for the user, based on the state of the presence information.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

FIGS. 7A and 7B illustrate representative routing scripts according to the present invention.

DETAILED DESCRIPTION OF THE INVENTION

In the following description, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Generally, the present invention provides a system, apparatus, and method for routing communication requests. A proxy or other server, configured to assist in managing sessions between networked devices, subscribes to the presence information of users of such networked devices. When the proxy/server receives notifications of presence information, it formulates a plan or "script" for routing calls according to the presence information. When a communication request arrives at the proxy/server for a particular networked device(s), the proxy/server applies the script in order to route the request to the destination that the user has identified via the presence information.

Figure 1:
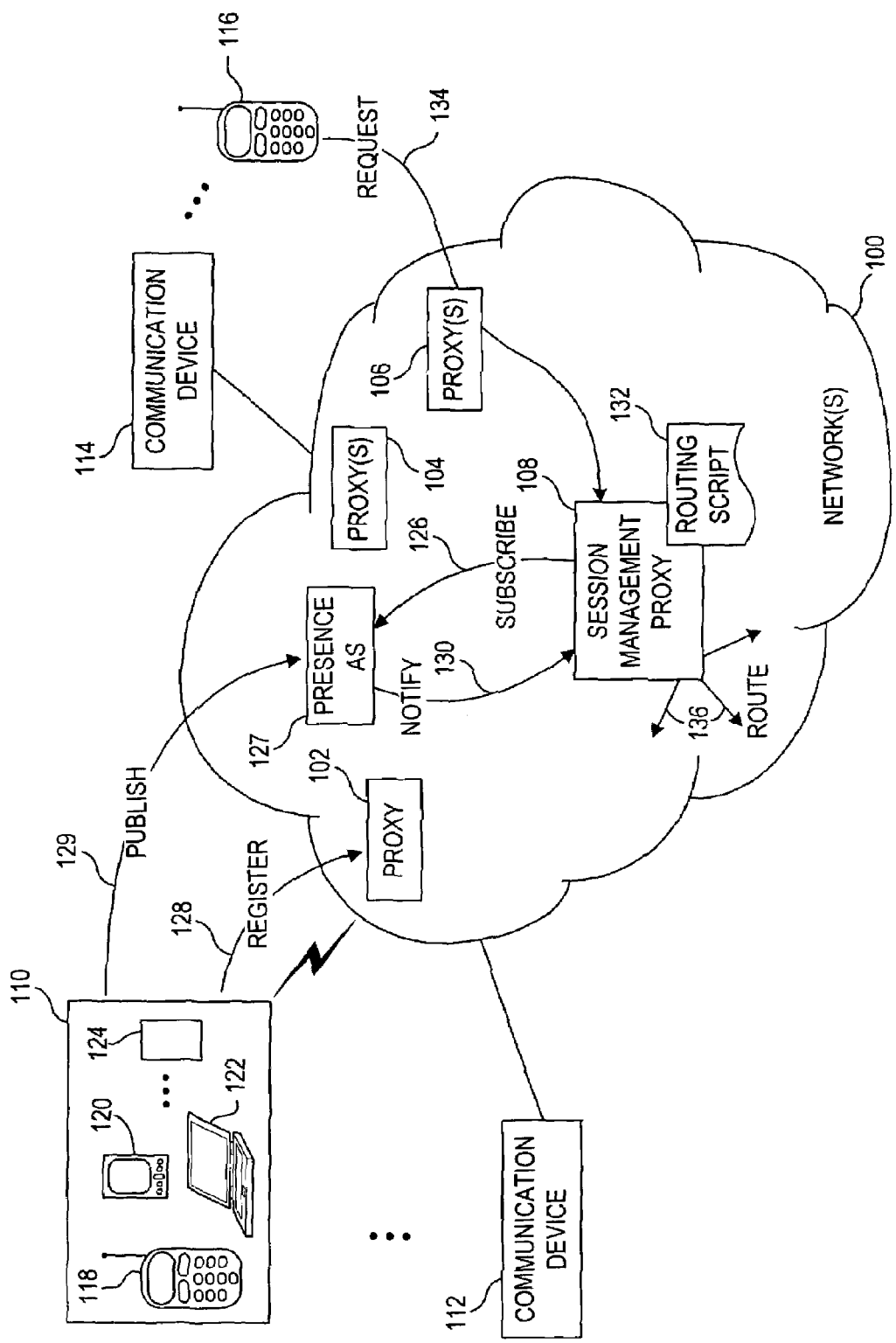
FIG. 1 is a block diagram illustrating a representative network system employing principles of the present invention.

FIG. 1 is a block diagram illustrating a representative network system employing principles of the present invention. In the illustrated embodiment, a network 100, which may include multiple interoperative networks, is used to communicate information between entities capable of communicating over the network(s) 100. The network 100 may include one or more proxies 102, 104, 106, and one or more session management proxies or servers 108. The proxies 102, 104, 106 represent network entities that at least provide a point of contact for associated communication devices. The session management proxy/server 108 represents a network entity that at least performs session management functions for the network 100 or network subsystem. Any number of different communication devices 110, 112, 114, 116 may communicate information over the network 100. These communication devices may be any type of communication devices, including landline devices such as workstations, desktop computers, portable computers, or any other computing/communication device capable of connecting to the network 100. The communication devices may also be mobile/wireless devices, such as the wireless device 110, which may include mobile phones 118, Personal Digital Assistants (PDAs) 120, portable computing devices 122, or any other device 124 capable of wireless communication with the network(s) 100.

In accordance with one embodiment of the invention, the session management proxy/server 108 subscribes 126 to the presence information of a user, such as the user of device 110. Generally, presence refers to the willingness and/or ability of a user to communicate with other users over a network. A variety of different preference indicators may be associated with a user's preference, such as user availability, connection status, various user identities, device capabilities, and the like. A subscription 126 generally refers to a manner in which a network entity can establish its interest in obtaining notification messages relating to particular events. In the illustrated embodiment, such events relate to the publication and/or modification of user presence information.

In the illustrated embodiment of the invention, the session management proxy 108 subscribes 126 to this presence information via a presence application server (AS) 127. More particularly, the user of device 110 may register 128 to the network 100 or network subsystem, which may result in a session management server 108 being assigned to that user. The user's presence information is published via the presence AS 127. For example, a publication message (e.g., SIP PUBLISH message) may be sent 129 from the device 110 to the presence AS 127, where the publication message includes the user's presence information. The device 110 may include a publication module (not shown), such as a processor executing appropriate software instructions, to create the appropriate publication message. While the publication message 129 is illustrated as being directly sent to the presence AS 127, such a message 129 would in fact be provided to the presence AS 127 by way of the appropriate proxies within the network 100, including the session management proxy 108. When the presence AS 127 receives original or modified presence information, it can notify any subscribers to that information, as described more fully below.

Upon assignment of the session management server 108 to the user, the session management server 108 subscribes 126 to the presence AS 127 associated with that user. It should be noted that the presence session management proxy 108 and presence AS 127 may be implemented in separate network entities, or may be co-located (i.e., both functional modules residing in a common location/housing). Where these functions are co-located, the subscription 126 may be performed by way of internal functionality. For example, the subscription may be made by sending internal messages, communicating via a communication protocol between devices at the co-located entity, through direct links, etc. In another embodiment of the invention, a session management proxy 108 may subscribe to such presence information at a different server or at the device 110 itself if they are capable of providing resulting notifications.

When the session management server 108 receives a notification(s) 130 of presence information, the session management server 108 (or another entity operating under the direction of the session management server 108) creates a script 132 for routing calls, messages, or the like, according to the presence information. If the presence information changes, corresponding notifications 130 are sent to the subscribing session management server 108 in accordance with one embodiment of the invention. Again, where the session management proxy 108 and presence AS 127 are co-located, such notifications 130 are "sent" internally, and may be internally communicated in any known fashion. In this manner, the session management server 108 is kept apprised of the current presence information for the user of the device 110, and the appropriate routing script 132 is created and maintained at the session management server 108.

When a request 134 from a device such as mobile device 116 and targeted for the user device 110 arrives at the session management server 108, the session management server 108 applies the routing script 132 to the request 134 in order to route the request to the destination according to the script 132. For example, assume the user of device 110 established presence information indicating that voice calls not associated with a predetermined address domain are to be treated as "busy." Upon terminal 110 registration 128 to the network 100, this presence information can be published, and the assigned session management server 108 can subscribe 126 to the presence information by way of the presence AS 127. When a notification 130 of this presence information is received at the session management server 108, a routing script 132 is created or updated. A device 116 may then attempt to contact the user of device 110 by sending a request 134 to initiate a session. The request may be communicated via one or more proxies 106, ultimately arriving at the session management server 108 associated with the user of device 110. The session management server 108 references the routing script 132 to determine the appropriate routing decision to make based on the user's 110 presence information. In the present example, assuming the user 116 is not associated with a predetermined address domain (e.g., xyz.com), the routing information will route 136 the request to a destination associated with a "busy" presence state of the user 110. For example, the routing information may direct such a request to the user's 110 voicemail.

Figure 2:
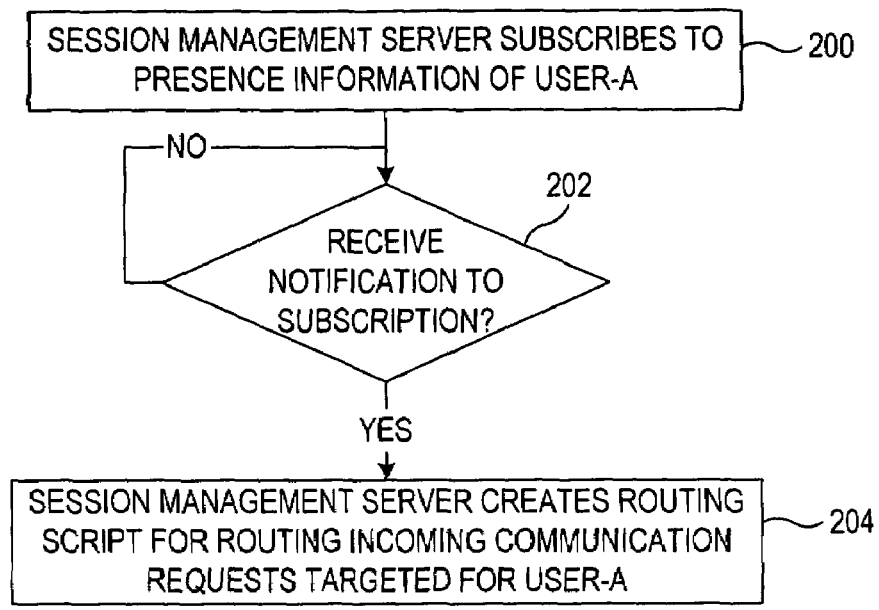
FIG. 2 is a flow diagram illustrating a manner of routing communication requests in accordance with one embodiment of the present invention.

FIG. 2 is a flow diagram illustrating a manner of routing communication requests in accordance with one embodiment of the present invention. A network entity performing session management functions subscribes 200 to the presence information of user-A. For example, the session management server may subscribe to a presence application server to which presence information of user-A is available or otherwise managed. If the session management server receives a notification corresponding to the subscription as determined at decision block 202, the session management server will create 204 a routing script based on the new or changed presence information of user-A. The routing script may then be used to route incoming communication requests that are targeted for user-A.

The present invention is applicable in any network environment employing a proxy, server, or other network entity that is involved in the management of sessions between devices on the network. In order to facilitate an understanding of the invention, particular examples of network environments, proxies, communication endpoints, and the like are described herein. For example, one representative network environment in which the present invention is applicable involves the 3rd Generation Partnership Project (3GPP) IP Multimedia core network Subsystem (IMS). Therefore, while various embodiments described herein are described in such an IMS environment, the present invention is not limited thereto and is equally applicable to other analogous network environments as will be readily apparent to those skilled in the art from the description provided herein.

Figure 3:
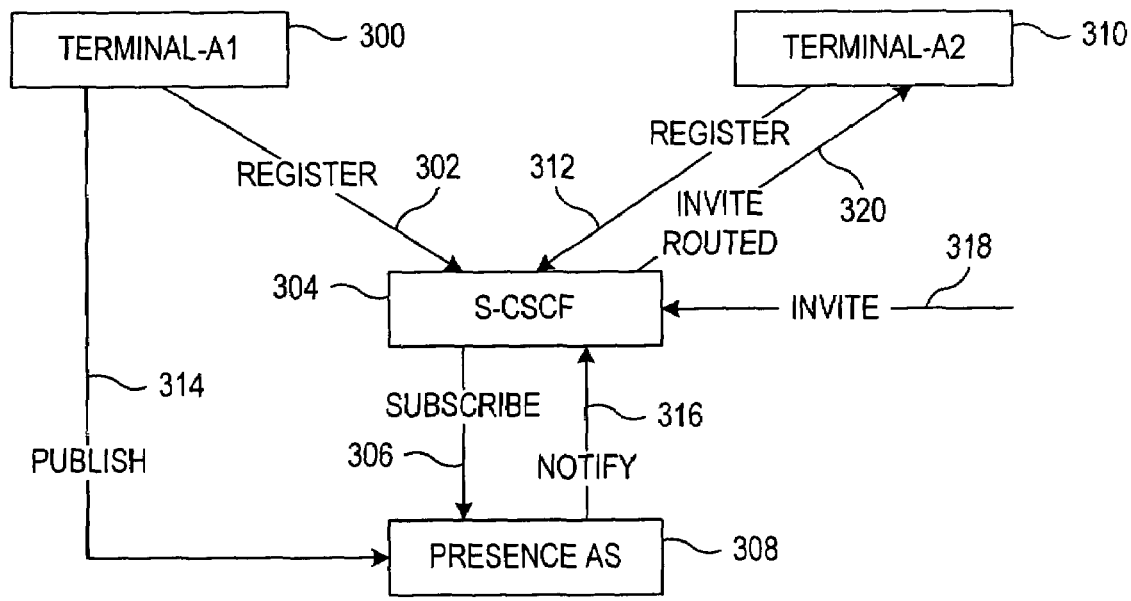
FIG. 3 is a block diagram illustrating one embodiment of the presence-based routing in accordance with the present invention.

FIG. 3 is a block diagram illustrating one embodiment of the presence-based routing in accordance with the present invention. In the embodiment of FIG. 3, the presence-based routing is implemented in an IMS environment. While IMS systems and components are known to those skilled in the art, a brief description of such an environment is set forth below.

IMS is an architecture for supporting multimedia services, which is currently specified to support such multimedia services via the Session Initiation Protocol (SIP) infrastructure. The IMS includes several network entities including signaling/session control elements, and database and application servers. The session control elements are generally referred to as Call Session Control Functions (CSCFs). These CSCFs are logical functions performed by the network, and include Proxy CSCFs (P-CSCF), Interrogating CSCFs (I-CSCF), and Serving CSCFs (S-SCSF).

The P-CSCF is the first contact point within the IMS that is seen by the user's User Equipment (UE), or more particularly by the User Agent (UA) of that UE. In an IMS network, services are performed for a user in his/her home network (also referred to as a home domain). If the user is roaming outside the home network and is therefore in a visited network, the UA's first point of contact is with the P-CSCF in the visited network, which then communicates with other CSCFs in the user's home network. One task of the P-CSCF is to provide user registrations to the user's home network in order to locate the CSCFs assigned to the user. More particularly, the P-CSCF may forward registrations to the I-CSCF in the user's home network, where the I-CSCF is a contact point to the user's home network. The I-CSCF is responsible for locating the appropriate S-CSCF by contacting the Home Subscriber Server (HSS) associated with the user's home network and obtaining the address of the S-CSCF. The S-CSCF performs the session control, registration, and other services for the subscriber in the subscriber's home network.

The 3GPP IMS utilizes SIP in order to achieve a wide range of functionality with the network. SIP, defined by the Internet Engineering Task Force (IETF), is an end-to-end signaling protocol that facilitates (among other things) the establishment, handling and release of end-to-end multimedia sessions. It can be used in a wide variety of applications, including presence applications. SIP enables network endpoints or "User Agents" (UA) to discover one another and to agree on a session characterization. UAs refer to the network endpoints that initiate SIP requests to establish media sessions, and to transmit/receive information. In order to locate other users, SIP utilizes the aforementioned infrastructure of network proxy servers such as the P-CSCF, I-CSCF and S-CSCF to which users can send registrations, invitations to sessions, and other requests via their terminals.

Referring now to FIG. 3, an exemplary embodiment of the present invention in an IMS environment is described. A first UA, terminal-A1 300, registers 302 to the S-CSCF 304 of the user's home network. For example, a SIP REGISTER message may be sent to the nearest P-CSCF (not shown) for that user, where the nearest P-CSCF may be located using Domain Name Service (DNS) SRV, Dynamic Host Configuration Protocol (DHCP), or the like. If the P-CSCF is in a visited network, the P-CSCF locates the I-CSCF of the home network for the user, and sends a REGISTER message 302 to the S-CSCF 304. Upon registration of terminal-A1 300, the S-CSCF 304 can subscribe 306 to the user's presence information at the presence application server (AS) 308. Other terminal applications, terminal-A2 310 also register 312 to the S-CSCF 304.

Terminal-A1 300 publishes 314 its presence information via the presence AS 308. In response to the previous subscription 306, the presence AS 308 generates a SIP NOTIFY message 316 to the S-CSCF 304 to notify it that the presence state of the user at terminal-A1 300 has changed. Using the new presence state, the S-CSCF 304 creates/modifies the routing script to correspond to the presence state of the user at terminal-A1.

At some point, another user may want to establish communication with terminal-A1 300. An incoming request to establish such communication, such as via a SIP INVITE request 318, is received at the S-CSCF 304 in the home network of the user of terminal-A1 300. Based on the presence state of the user, the INVITE request is routed 320 to terminal-A2 310 whose presence information indicates that it is available in the illustrated embodiment. The presence information of the user at terminal-A1 300 could subsequently change, thereby resulting in subsequent INVITE requests 318 being routed to the terminal-A1 300, or to another terminal/destination.

Figure 4:
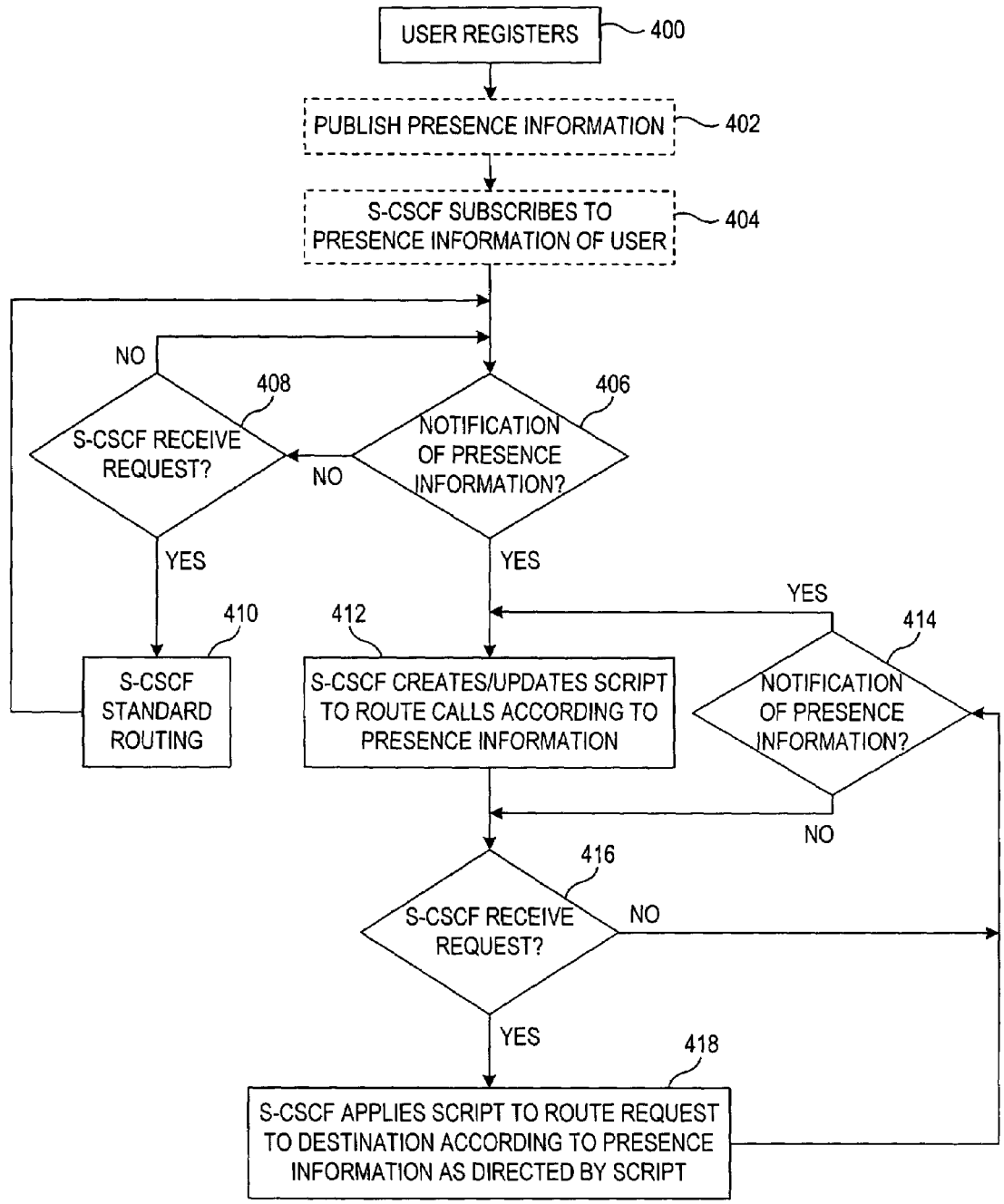
FIG. 4 is a flow diagram illustrating one embodiment of a manner of routing communication requests in an IMS environment in accordance with one embodiment of the present invention.

FIG. 4 is a flow diagram illustrating one embodiment of a manner of routing communication requests in an IMS environment in accordance with one embodiment of the present invention. In the illustrated embodiment, the user registers 400 to the IMS network. When the user registers, the standard behavior of the IMS is that the user is assigned an S-CSCF. The user may optionally publish 402 his/her presence information, and the S-CSCF may subscribe 404 to the presence information of the user. Whether the user's presence information is published 402 is a decision to be made by the user. Similarly, the particular S-CSCF may or may not be configured to subscribe 404 to the published presence information of that user or other users. If the S-CSCF receives no notification of presence information as determined at decision block 406, and the S-CSCF were to receive a request (e.g., INVITE) targeted for the user as determined at decision block 408, the S-CSCF would simply use standard routing 410. This could occur, for example, if the user did not publish his/her presence information and/or if the S-CSCF did not subscribe to the presence information. However, in accordance with the present invention, receipt of a notification as determined at decision block 406 results in the S-CSCF creating 412 a script to route calls (including voice, messages, etc.) according to the presence information.

At any time, the presence information may change. For example, the user may move to a different location, or an event may change causing the user's presence information to be updated. If the presence information changes as determined at decision block 414, the S-CSCF will update 412 the script to route the calls according to the updated presence information. When the S-CSCF receives a request (e.g., INVITE) targeted for the user as determined at decision block 416, the S-CSCF applies 418 the script in order to route the request to the destination according to the presence information as directed by the script.

Figure 5:
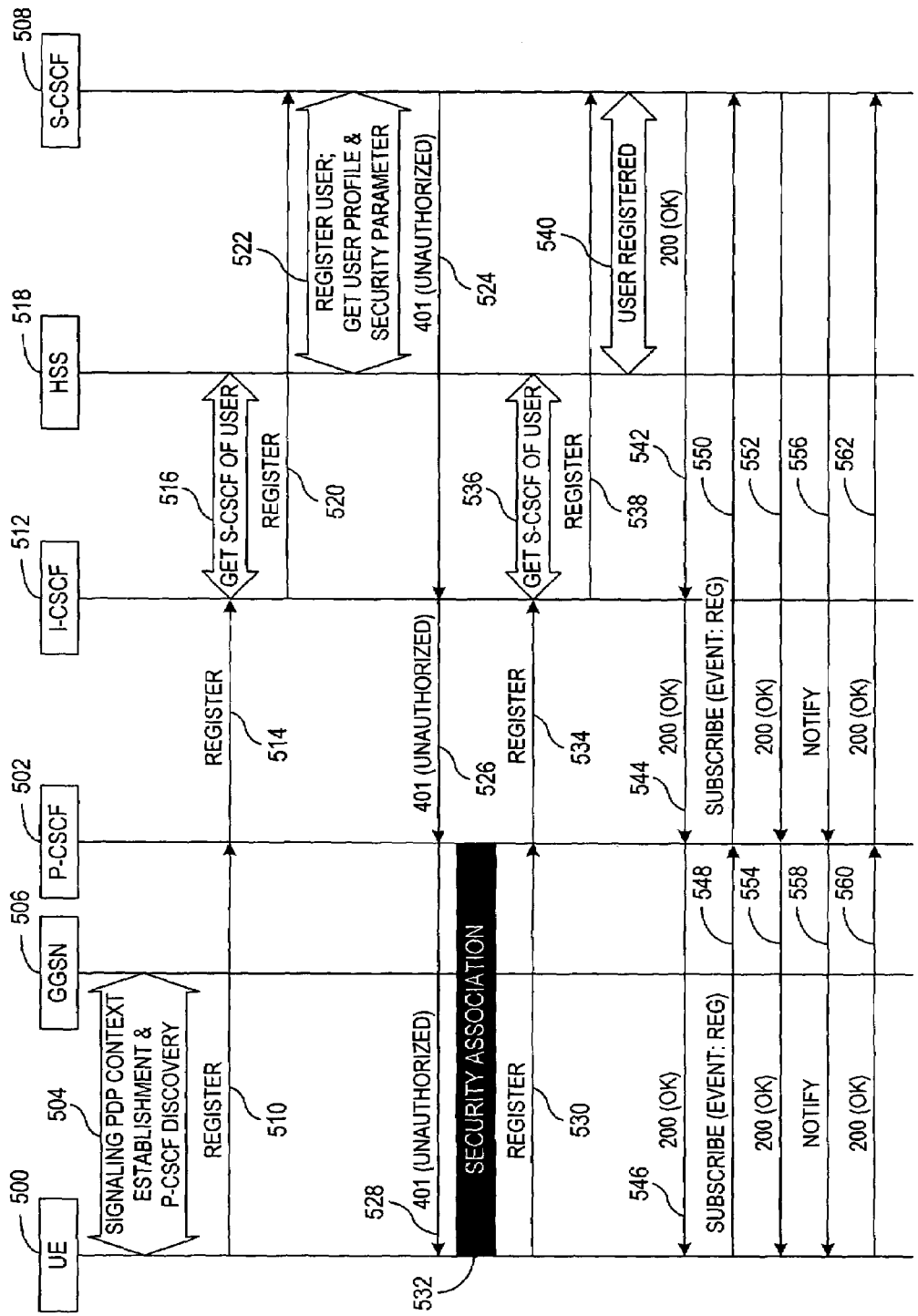
FIG. 5 is a message flow diagram illustrating one representative manner in which a user may register to an S-CSCF.

FIG. 5 is a message flow diagram illustrating one representative manner in which a user may register to an S-CSCF. The embodiment shown in FIG. 5 assumes that a mobile user using UE 500 communicates with the IMS network by way of a General Packet Radio Service (GPRS) network. The UE 500 initially does not know the address of the P-CSCF 502 to perform a SIP registration, and performs the appropriate functions 504 to set up a data connection. The UE 500 performs GPRS Attach procedures and establishes a Packet Data Protocol (PDP) context, which establishes the path to carry SIP messages to the P-CSCF 502. More particularly, the UE 500 sends an Attach message to a Serving GPRS Support Node (SGSN; not shown) that includes a subscriber identifier. After certain authentication and profile procedures, the SGSN completes the Attach procedure and provides an Attach Complete to the UE 500, and the location of the mobile UE 500 is now known to the network. Once attached, the UE 500 activates a PDP address that sets up an association between the SGSN and the Gateway GPRS Support Node (GGSN) 506. As is known in the art, a GGSN acts as a gateway between the GPRS network and a packet switched public data network, such as an IMS network. The GPRS allows mobile subscribers to access the data network or specified private IP networks through a standard protocol, such as the Internet Protocol (IP). Establishing a PDP context, which identifies the association between the SGSN and GGSN, activates an address for the UE 500 so that the UE 500 can communicate using that address. Further, the P-CSCF 502 may be located using Domain Name Service (DNS) SRV, Dynamic Host Configuration Protocol (DHCP), or the like.

When the UE 500 has attached to the GPRS network, a PDP context has been established, and the P-CSCF 502 has been located, the UE 500 needs to register to be able to set up SIP sessions. The registration process informs the IMS network where the UE 500 is. More particularly, the UE 500 needs to have an S-CSCF 508 from its home network assigned to the UE 500. This registration process is first depicted via registration path 510 between the UE 500 and the P-CSCF 502, where a SIP REGISTER message is sent. The REGISTER message includes information such as the identity of the subscriber and a domain name for the user's home network. Using this information, the P-CSCF 502 determines the entry point to the user's home network. The present example assumes that an I-CSCF 512 is used as the entry point to the user's home network; i.e., the user is not located in his/her home network. Therefore, the P-CSCF 502 discovers the I-CSCF 512 with the assistance of other network entities such as the DNS. The P-CSCF 502 sends the REGISTER message 514 to the I-CSCF 512 with the appropriate information. The I-CSCF 512 queries 516 the HSS 518 to identify the S-CSCF 508. The I-CSCF 512 can determine the address of the HSS 518 using information from the received REGISTER message 514. The I-CSCF 512 determines the address of the S-CSCF 508, and sends the REGISTER message 520 to the S-CSCF 508.

The S-CSCF 508 and HSS 518 may communicate information 522 to register the user and to get user profile and security parameters. Where no authentication is required for registration, the S-CSCF 508 may respond to the REGISTER message 520 with a confirmation message that registration is complete, such as a "200 OK" response. Where registration with authentication is implemented, the S-CSCF 508 may request authentication credentials, such as by sending a "401 (Unauthorized)" response back to the UE 500 as shown on paths 524, 526, 528. The UE 500 then sends a new REGISTER message 530 using its authentication credentials obtained via the security association 532. The REGISTER message 534 is then sent from the P-CSCF 502 to the I-CSCF 512, which queries 536 the HSS 518 to identify the S-CSCF 508, and sends the REGISTER message 538 to the S-CSCF 508. The user is registered 540, and the S-CSCF 508 sends a registration/authorization complete message, such as the "200 OK" messages shown on paths 542, 544, 546 back to the UE 500.

The UE 500 may then subscribe 548, 550 to events, such as an event package for registrations (EVENT:REG). User agents can create, modify, and delete registrations, and administrators can also modify registrations to enforce policy. Therefore, the UE 500 may want to be notified of such registration state changes. The subscription 548, 550, and resulting "200 OK" 552, 554 response establishes such a subscription. In this manner, the S-CSCF 508 may notify (e.g., SIP NOTIFY) 556, 558 the UE 500 with changes in registration state, to which the UE 500 will acknowledge 560, 562.

The above registration procedure is a description of one general registration scenario that may be utilized in connection with the present invention. However, any known registration methodology may be implemented. Details on such GRPR attach, PDP context, and SIP registration procedures are known in the art and are not further presented here.

Figure 6:
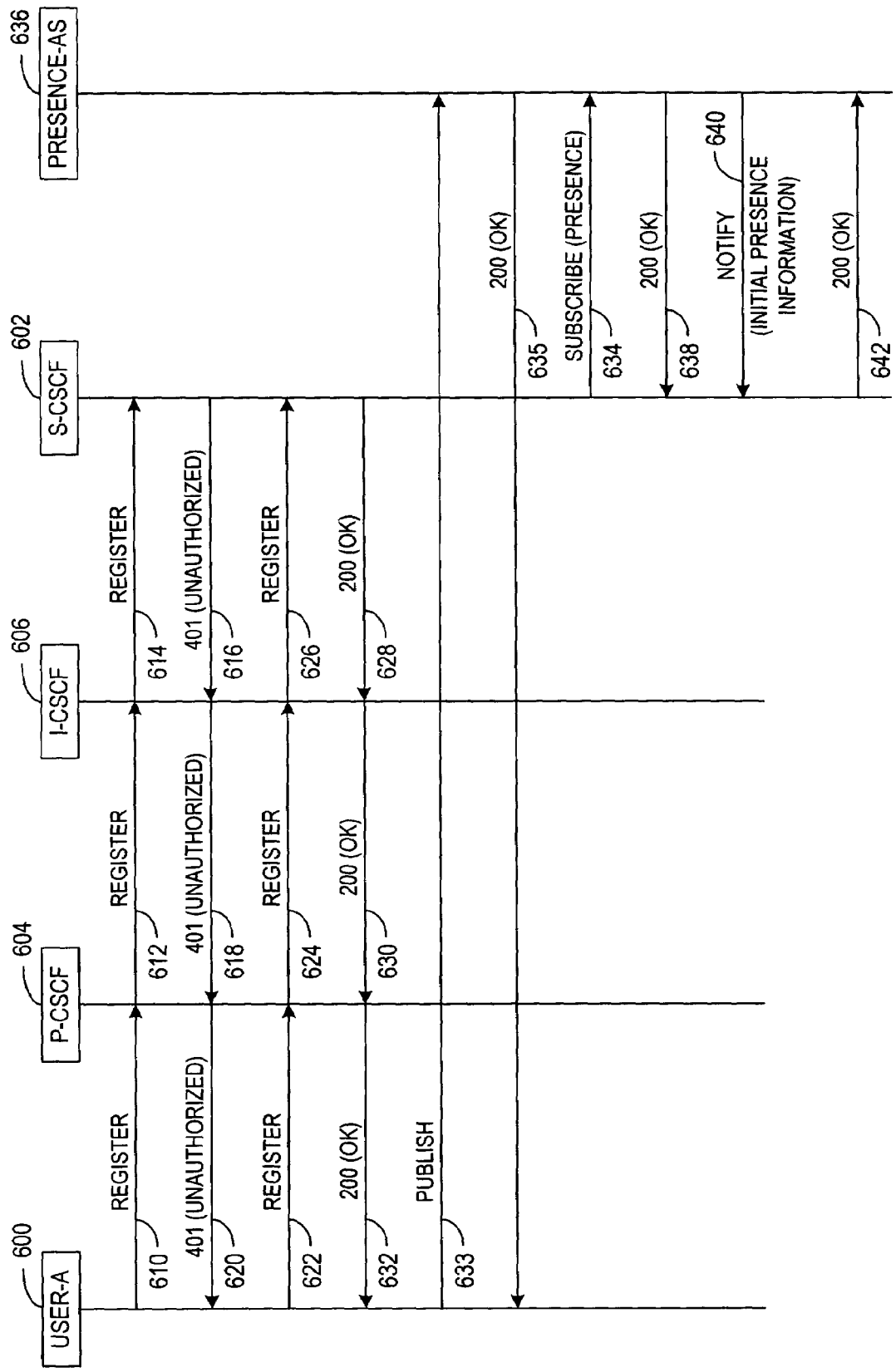
FIG. 6 is a message flow diagram illustrating an exemplary embodiment for subscribing an S-CSCF to the presence information for a user.

FIG. 6 is a message flow diagram illustrating an exemplary embodiment for subscribing an S-CSCF to the presence information for a user. In the illustrated embodiment of FIG. 6, a registration process is performed such as that described in connection with FIG. 5. In FIG. 6, the registration process is depicted between User-A 600 and S-CSCF 602, with the P-CSCF 604 and I-CSCF 606 involved as previously described. Briefly, a registration request such as a SIP REGISTER message is passed 610, 612, 614 to the S-CSCF 602, and the S-CSCF 602 responds with a request for authorization credentials (assuming registration with authorization) as illustrated by the "401 (Unauthorized)" responses 616, 618, 620. User-A 600 then registers 622, 624, 626 with the proper authentication credentials, and the S-CSCF 602 responds with a message (e.g., "200 OK") 628, 630, 632 indicating that the authentication is verified and the registration is complete.

At some point, User-A 600 may publish 633 the presence information to the presence AS 636, such as by issuing a SIP PUBLISH request. This can occur at any point in time, and is not temporally limited to the point in time as illustrated in FIG. 6. For example, User-A 600 may publish 633 presence information after the S-CSCF 602 subscribes 634 to the presence information of User-A 600, or beforehand as shown in the illustrated embodiment. The presence AS 636 may respond with an appropriate message, such as the 200 (OK) message 635. In any case, the S-CSCF 602 initiates a subscription to the presence information of User-A, such as by issuing a SUBSCRIBE request 634 to a presence application server (AS) 636. It should be noted that the S-CSCF 602 and presence AS 636 may be implemented in separate network entities, or may be co-located. In response to the subscription request, the presence AS 636 responds with a message, such as a "200 OK" message 638, indicating success of the subscription. The presence AS 636 maintains the presence information/state of User-A 600. The presence AS 636 then provides a notification to the S-CSCF 602, such as a SIP NOTIFY message 640, providing the initial presence information for User-A 600. The S-CSCF 602 responds to acknowledge receipt of the NOTIFY 640 message, such as by sending a "200 OK" response 642. Further changes in the state of the presence information of User-A will result in additional NOTIFY 640 messages being sent from the presence AS 636 to the S-CSCF 602. Using the presence information, the S-CSCF 602 can create the routing script previously described.

The routing script in accordance with the present invention may be created in any number of manners. FIGS. 7A and 7B illustrate representative routing scripts according to the present invention, where the actual script is programmed in a manner suitable for the environment in which it is used. The routing scripts shown in FIGS. 7A and 7B are provided to illustrate examples of routing scripts, and an actual routing script will depend on at least the particular presence information provided and the programming language implemented. Therefore, the routing script examples of FIGS. 7A and 7B are provided for illustrative purposes only, and the routing scripts according to the present invention are clearly not limited to the specific examples shown in FIGS. 7A and 7B.

The routing script created at the S-CSCF or other session management server is based on user presence information. For purposes of the example of FIG. 7A, it is assumed that the user's presence information is as shown in Table 1A below.

TABLE 1A

| Presence Item | Presence Status |
|---|---|
| Mobile-phone voice | Status "available" for callers from ExampleDomain.com Status "busy" for all other callers |
| Mobile-phone video | Status "busy" for all callers |

The user's presence information in this example provides presence status for two presence items. The first presence item relates to voice communications for the user's mobile phone. The current presence status indicates that the user is available to receive calls from callers having an address from "ExampleDomain.com." The presence status is "busy" for all other mobile-phone voice calls. For mobile-phone video communications, the status is "busy" for all callers.

This embodiment therefore illustrates that there may be different presence information to subscribers from different domains. This is more evident by re-presenting the presence information as shown in Table 1B below:

TABLE 1B

| Presence Item | Presence Status |
|---|---|
| Voice | ExampleDomain: available on mobile phone Other domains: busy |
| Video | All domains: busy |

When the S-CSCF receives such presence information (e.g., from a presence AS or other network entity), it is converted into a routing script. By creating such a routing script at the IMS network, the user's presence information will be considered for all calls through the IMS network that are directed to that user. Otherwise, without the benefit of the present invention, a user could set his/her presence information at the mobile device, but would still receive unwanted calls or other session initiation requests where the network does not take the user's presence status into consideration. Further, without the benefit of the present invention, the user would have to create his/her own scripts. The use of the network-based routing script as described herein provides additional advantages as well.

FIG. 7A illustrates an example routing script 700 for the presence information shown in Tables 1A/B, which can be programmed in any appropriate language, implemented in hardware, or implemented using a combination of hardware and software. A first segment 702 of the routing script 700 is directed to mobile-phone voice calls where callers are from the domain "ExampleDomain.com." If the caller domain is "ExampleDomain.com" and the call type is "voice," then the call will be routed to the user's mobile phone. More particularly, the call may be routed to the SIP address "sip:user@mobilephone.operator.com," where "user" identifies the user, and "mobilephone" identifies the destination at the domain "operator.com." Therefore, if a voice call is received from, for example, callinguser@ExampleDomain.com, the condition will be met and the call will be routed to "sip:user@mobilephone.operator.com."

A second segment 704 of the routing script 700 is directed to mobile-phone non-voice calls where callers are from the domain "ExampleDomain.com." If the caller domain is "ExampleDomain.com" and the call type is not "voice," then the non-voice call will be routed to the user's voicemail system. More particularly, the non-voice call may be routed to the SIP address "sip:user@PDA.operator.com," where "user" identifies the user, and "PDA" identifies the PDA destination at the domain "operator.com." The status shown to such callers may be shown as "busy" or other appropriate indication. Therefore, if a video call is received from callinguser@ExampleDomain.com, the routing script will cause the video call to be routed to "sip:user@PDA.operator.com," since it is not a voice call. It should be recognized that other manners of routing a video call to the desired destination may be implemented, such as monitoring for a call type of "video" rather than monitoring for a call type that is anything other than "voice" (although in such a case, it would be appropriate to include a default routing segment to route "ExampleDomain.com" calls that are neither voice nor video).

If neither of the conditions is met in the first two if/else-if segments 702, 704, then a third segment 706 of the routing script 700 is executed. This segment 706 is directed to all calls from caller domains other than "ExampleDomain.com." If the caller domain is not "ExampleDomain.com," then the call will be routed to the user's voicemail system. More particularly, the may be routed to the SIP address "sip:user@voicemail.operator.com," where "user" identifies the user, and "voicemail" identifies the voicemail destination at the domain "operator.com." Therefore, if a call is received from, for example, callinguser@OtherDomain.com, the call will be routed to "sip:user@voicemail.operator.com."

Another representative routing script is illustrated in FIG. 7B. For purposes of the example of FIG. 7B, it is assumed that the user's presence information is as shown in Table 2 below.

TABLE 2

| Presence Item | Presence Status |
| --- | --- |
| Video | mobile phone 1: busy |
|  | mobile phone 2: busy |
|  | PDA: available |
| Voice | busy |

The user's presence information in this example provides presence status for two presence items, including video and voice. The current presence status indicates that the user is available to receive video calls on the user's PDA, but the status is "busy" for both mobile phone-1 and mobile phone-2. For voice calls, the user's presence status is "busy" for all devices.

When the S-CSCF receives the presence information as set forth in Table 2, it is converted into a routing script, such as the example routing script 710 shown in FIG. 7B. A first segment 712 of the routing script 710 is directed to video calls. If the call type is "video," then the call will be routed to the user's PDA. More particularly, a video call will be routed to the SIP address "sip:user@PDA.operator.com," where "user" identifies the user, and "PDA" identifies the destination at the domain "operator.com."

A second segment 714 of the routing script 710 is directed to voice calls. If the call type is "voice," then the call will be handled in a predefined manner for a busy status, such as routing the voice call to a voicemail system. More particularly, a voice call will be routed to the SIP address "sip:user@voicemail.operator.com," where "user" identifies the user, and "voicemail" identifies the voicemail destination at the domain "operator.com." The status shown to such callers may be shown as "busy" or other appropriate indication.

In this manner, particular attributes (e.g., call type, caller domain, particular caller identity(s), caller equipment type, call priority, etc.) are used to access the appropriate routing information in the routing script. The incoming communication requests are routed to the appropriate destination(s) based on the routing script and the attributes of the communication requests. The routing script may be implemented as a program, or in other manners such as a table or other data structure which can be indexed by the particular attributes of the communication requests.

In some cases, the S-CSCF or other session management entity may be unable to perform any type of scripting language. However, in such cases, filter criteria may be dynamically changed by the S-CSCF/session management entity based on the user presence information. Filter criteria refers to information downloaded from the HSS to the S-CSCF at user registration. This information may include, for example, the address of an application server to be contacted; priority; trigger points such as header content, presence or absence of a header, a particular method, etc.; default handing information, and the like. In accordance with one embodiment of the invention, the S-CSCF dynamically changes the filter criteria based on the user presence information, when the S-CSCF is not authorized or otherwise able to perform any type of scripting language. For example, based on the presence information, filter criteria relating to application server or other addresses may be changed to effect routing changes based on the user presence information.

Figure 8:
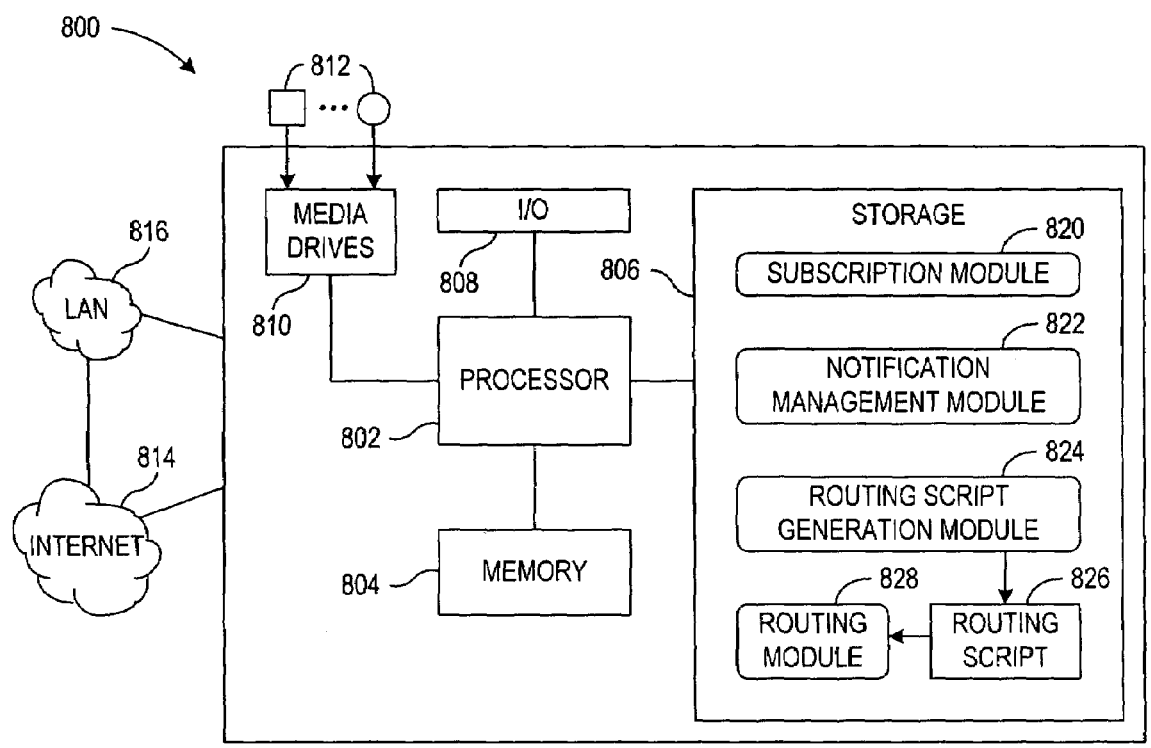
FIG. 8 is a block diagram illustrating a representative computing implementation for a session management server capable of carrying out operations in accordance with the invention.

Hardware, firmware, software or a combination thereof may be used to perform the functions and operations in accordance with the invention. An example of a representative computing implementation of a session management server 800 capable of carrying out operations in accordance with the invention, such as an S-CSCF, is illustrated in FIG. 8.

The representative computing arrangement suitable for performing the presence subscription, route script generation/maintenance, and request routing functions includes a central processor 802, which may be coupled to memory 804 and storage 806. The processor 802 carries out a variety of standard computing functions as is known in the art, as dictated by software and/or firmware instructions. The storage 806 may represent firmware, hard-drive storage, etc. The storage 806 may also represent other types of storage media to store programs, such as programmable ROM (PROM), erasable PROM (EPROM), etc. The processor 802 may communicate with other internal and external components through input/output (I/O) circuitry 808. The computing system 800 may also include one or more media drive devices 810, including hard and floppy disk drives, CD-ROM drives, DVD drives, and other hardware capable of reading and/or storing information. In one embodiment, software for carrying out the operations in accordance with the present invention may be stored and distributed on CD-ROM, diskette or other form of media capable of portably storing information, as represented by media devices 812. These storage media may be inserted into, and read by, the media drive devices 810.

Such software may also be transmitted to the computing arrangement 800 via data signals, such as being downloaded electronically via a network, such as the Internet 814, Local Area Network (LAN) 816, or other network.

In accordance with one embodiment of the invention, the storage 806, memory 804, and/or media devices 812 store the various programs and data used in connection with the present invention. In the illustrated embodiment of FIG. 8, the storage 806 is shown storing the various program modules operable in connection with the processor 802, as well as relevant data. For example, the illustrated embodiment depicts a subscription module 820, which performs the subscription to the user's presence information. For example, the subscription module 820 may generate a SIP SUBSCRIBE message to subscribe to the presence information at a presence application server. The notification management module 822 manages the notifications received at the system 800. More particularly, this module 822 will receive SIP NOTIFY messages and obtain the user presence information associated with such a notification. The routing script generation module 824 converts the presence information into a routing script 826. When a call or other session initiation request arrives at the computing system 800, the routing module 828 identifies the appropriate destination for which the incoming request is to be forwarded, as directed by the routing script 826. An appropriate network interface mechanism or other transmitter is used to transmit the request to the appropriate destination. Standard functions performed by a session management module/S-CSCF for managing sessions, such as those relating to SIP registrations or other IMS networking functions, are not shown in FIG. 8.

The computing arrangement 800 of FIG. 8 is provided as a representative example of a computing environment in which the principles of the present invention may be applied. From the description provided herein, those skilled in the art will appreciate that the present invention is equally applicable in a variety of other computing arrangements.

The foregoing description of the exemplary embodiment of the invention has been presented for the purposes of

What is claimed is:

1. A method for routing communication requests targeted for a user over a network, comprising:
   subscribing a network entity to presence information of the user, the presence information indicating conditions under which the user may be contacted;
   receiving at least one notification at the subscribing network entity indicating a state of the presence information of the user;
   creating routing instructions for routing incoming communication requests targeted for the user, based on the state of the presence information; and
   receiving filter criteria at the network entity from a database entity, and wherein creating routing instructions for routing incoming communication requests comprises dynamically modifying the filter criteria based on the presence information of the user.

2. The method of claim 1, further comprising routing the incoming communication requests according to the routing instructions.

3. The method of claim 2, further comprising storing the routing instructions for reference by the network entity upon receipt of the incoming communication requests targeted for the user.

4. The method of claim 1, wherein creating routing instructions for routing incoming communication requests comprises creating a routing script, and further comprising storing the routing script for reference by the network entity upon receipt of the incoming communication requests targeted for the user.

5. The method of claim 1, wherein receiving at least one notification at the subscribing network entity indicating a state of the presence information comprises receiving one or more notifications at the subscribing network entity indicating a change of state of the presence information.

6. The method of claim 1, wherein receiving at least one notification at the subscribing network entity indicating a state of the presence information comprises receiving a notification at the subscribing network entity indicating a state of the presence information at the time of the subscription of the network entity to the presence information.

7. The method of claim 1, further comprising registering one or more terminal applications with the network entity, and wherein subscribing the network entity to presence information of the user comprises subscribing the network entity to the presence information of the user in response to the registration of the one or more terminal applications.

8. The method of claim 1, further comprising publishing the presence information of the user.

9. The method of claim 8, wherein publishing the presence information of the user comprises publishing the presence information via a presence application server.

10. The method of claim 9, wherein subscribing the network entity to the presence information of the user comprises subscribing the network entity to the presence information at the presence application server.

11. The method of claim 10, wherein receiving at least one notification at the subscribing network entity indicating a state of the presence information of the user comprises receiving a notification at the subscribing network entity from the presence application server indicating a state of the presence information of the user.

12. The method of claim 1, wherein the network includes an IP Multimedia core network Subsystem (IMS) network and the network entity includes a Serving Call Session Control Function (S-CSCF), and wherein subscribing the S-CSCF to presence information of the user comprises providing a Session Initiation Protocol (SIP) SUBSCRIBE message from the S-CSCF to a presence application server to which the presence information of the user is published.

13. The method of claim 12, wherein receiving at least one notification at the subscribing network entity comprises receiving at least one SIP NOTIFY message at the S-CSCF from the presence application server.

14. A method for routing communication requests targeted for a user over a network including an IP Multimedia core network Subsystem (IMS) network, comprising:
   subscribing a Serving Call Session Control Function (S-CSCF).to user presence information published on the network, the user presence information indicating conditions under which the user may be contacted;
   receiving at least one notification at the S-CSCF indicating a state of the user presence information;
   creating a routing script at the S-CSCF based on the state of the user presence information;
   routing the communication requests, targeted for the user and received at the S-CSCF, to one or more destinations as dictated by the routing script; and
   receiving filter criteria at the S-CSCF from a database entity, and wherein creating the routing script comprises dynamically modifying the filter criteria based on the presence information of the user.

15. The method of claim 14, further comprising identifying one or more attributes of the communication requests received at the S-CSCF, and wherein routing communication requests to one or more destinations comprises routing the communication requests as dictated by the routing script and depending on the attributes of the communication requests.

16. The method of claim 15, wherein the attributes of the communication requests comprise at least one of a caller identity, a caller domain, a caller equipment type, a communication request priority, and a communication request type.

17. The method of claim 14, further comprising publishing the user presence information at a presence network entity coupled to the network, and wherein subscribing the S-CSCF to the user presence information published on the network comprises subscribing the S-CSCF to the user presence information at the presence network entity.

18. The method of claim 17, further comprising issuing a publication message including the user presence information from the user's User Equipment (UB) to the presence network entity, and wherein publishing the user presence information at a presence network entity comprises publishing, at the presence network entity, the user presence information provided via the publication message.

19. The method of claim 14, wherein subscribing the S-CSCF to the user presence information comprises issuing a SIP SUBSCRIBE message from the S-CSCF to a presence network entity to which the user presence information is published, in response to user registration to the IMS network via the S-CSCF.

20. The method of claim 14, wherein receiving at least one notification at the S-CSCF comprises receiving a SIP NOTIFY message at the S-CSCF from a presence network entity to which the user presence information is published, in response to a change of state of the user presence information.

21. The method of claim 14, wherein receiving at least one notification at the S-CSCF comprises receiving a SIP NOTIFY message at the S-CSCF from a presence network entity to which the user presence information is published, wherein the NOTIFY message indicates a state of the user presence information at the time of the subscription of the S-CSCF to the presence network entity.

22. The method of claim 14, wherein creating a routing script at the S-CSCF comprises creating a program to cause incoming communication requests targeted for the user to be routed according to the user presence information upon execution of the program.

23. The method of claim 14, wherein creating a routing script at the S-CSCF comprises creating a data structure that provides routing actions for each association of the user presence information and communication request attributes.

24. The method of claim 23, wherein routing communication requests comprises routing the communication requests according to the routing actions of the data structure.

25. A network entity for routing communication requests targeted for a user over a network, comprising:
a processor;
a subscription module operable with the processor and configured to subscribe to user presence information published on the network, the user presence information indicating conditions under which the user may be contacted;
a notification management module operable with the processor and configured to receive notifications of a state of the user presence information;
a routing instruction generation module operable with the processor and configured to convert the state of the user presence information to routing instructions; and
a routing module operable with the processor and configured to identify one or more routing destinations for incoming communication requests targeted for the user based on the routing instructions, wherein the routing instruction generation module comprises a filter criteria modification module operable with the processor and configured to dynamically modify, based on the user presence information, filter criteria received at the network entity from a database entity, and wherein the modified filter criteria comprises the routing instructions.

26. The network entity as in claim 25, wherein the network comprises an IP Multimedia core network Subsystem (IMS) network, and the network entity comprises a Serving Call Session Control Function (S-CSCF).

27. The network entity as in claim 25, further comprising a transmitter to transmit the incoming communication requests to the routing destinations.

28. The network entity as in claim 25, wherein the routing instruction generation module comprises a routing script generation module operable with the processor and configured to convert the state of the user presence information to a routing script.

29. A system for routing communication requests via an IP Multimedia core network Subsystem (IMS) network, comprising:
a User Equipment (UE);
a presence server coupled to receive and publish presence information associated with the UE, the presence information indicating conditions under which a user of the UE may be contacted; and
a Serving Call Session Control Function (S-CSCF) comprising a processor configured to subscribe to the published presence information associated with the UE and to receive notifications of a state of the published presence information, and further configured to generate routing instructions for incoming communication requests targeted for the UE based on the state of the published presence information, and further configured to dynamically modify, based on thr presence information, filter criteria recieved from a database entity, and wherein the modified filter criteria comprises the routing instructions.

30. The system as in claim 29, wherein the S-CSCF further comprises a memory for storing the routing instructions for use in routing the incoming communication requests.

31. The system as in claim 29, wherein the processor of the S-CSCF is further configured to identify routing destinations for the incoming communication requests targeted for the UE based on the routing instructions.

32. The system as in claim 29, wherein the UE comprises a publication module configured to publish the presence information associated with the UE.

33. A computer-readable medium having instructions stored thereon which are executable by a computer system for routing communication requests targeted for a user over a network by performing steps comprising:
subscribing a network entity to presence information of the user, the presence information indicating conditions under which the user may be contacted;
receiving at least one notification at the subscribing network entity indicating a state of the presence information of the user;
creating routing instructions for routing incoming communication requests targeted for the user, based on the state of the presence information and;
receiving filter criteria from a database entity, and wherein creating routing instructions for routing incoming communication requests comprises dynamically modifying the filter criteria based on the presence information of the user.

* * * * *

UNITED STATES PATENT AND TRADEMARK OFFICE
CERTIFICATE OF CORRECTION

PATENT NO. : 7,280,533 B2 Page 1 of 1
APPLICATION NO. : 10/686000
DATED : October 9, 2007
INVENTOR(S) : Khartabil et al.

It is certified that error appears in the above-identified patent and that said Letters Patent is hereby corrected as shown below:

Col. 16, Claim 18, line 54: "(UB)" should read --(UE)--.

Signed and Sealed this

Eighteenth Day of December, 2007

JON W. DUDAS
*Director of the United States Patent and Trademark Office*